United States Patent [19]

Schoonhoven et al.

[11] Patent Number: 5,017,535

[45] Date of Patent: May 21, 1991

[54] PROCESS FOR THE PREPARATION OF A PRESULFIDED AND SULFIDED CATALYST

[75] Inventors: Johannes W. F. M. Schoonhoven, Leusden; Sonja Eijsbouts, Hertogenbosch; Jacobus J. L. Heinerman, Amsterdam, all of Netherlands; Ludwig Eisenhuth, Obernburg, Fed. Rep. of Germany

[73] Assignee: Akzo N.V., Arnhem, Netherlands

[21] Appl. No.: 540,951

[22] Filed: Jun. 20, 1990

[51] Int. Cl.$^5$ .................. B01J 27/30; B01J 37/20; B01J 27/051; C10G 49/04

[52] U.S. Cl. .................. 502/30; 208/216 R; 502/29; 502/31; 502/168; 502/219; 502/220

[58] Field of Search .......... 502/30, 29, 31, 33, 502/34, 53, 26, 168, 219, 220; 208/216 R

[56] References Cited

U.S. PATENT DOCUMENTS

| | | | |
|---|---|---|---|
| 2,623,007 | 12/1952 | Myers | 502/219 |
| 4,213,850 | 7/1980 | Riddick, Jr. et al. | 502/220 |
| 4,530,917 | 7/1985 | Berrebi | 502/168 |
| 4,719,195 | 1/1988 | Toulhoat et al. | 502/168 |
| 4,725,569 | 2/1988 | Tuszynski et al. | 502/168 |
| 4,845,068 | 7/1989 | Takahashi et al. | 502/168 |
| 4,983,558 | 1/1991 | Born et al. | 502/31 |
| 4,992,403 | 2/1991 | Takahashi et al. | 502/164 |

FOREIGN PATENT DOCUMENTS

| | | |
|---|---|---|
| 0289211 | 11/1988 | European Pat. Off. |
| 0329499 | 3/1989 | European Pat. Off. |
| 0352851 | 1/1990 | European Pat. Off. |
| 2627104 | 8/1989 | France |
| 63-302952 | 12/1988 | Japan |

OTHER PUBLICATIONS

H. Hallie, Oil and Gas Journal, Dec. 20, 1982, Technology, pp. 69–74.

M. De Wind et al., Upflow versus Downflow Testing of Hydrotreating Catalysts, Applied Catalysis, 43 (1988), 239–252.

United Nations Publications, Chapter 14, pp. 365–377, 5th revised edition.

Primary Examiner—Paul E. Konopka
Attorney, Agent, or Firm—Louis A. Morris

[57] ABSTRACT

Disclosed is a process for the ex situ presulfidation of hydrotreating catalysts employing organic sulfur compounds with a boiling point exceeding 100° C. and satisfying the formula

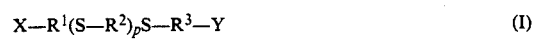

$$X-R^1(S-R^2)_pS-R^3-Y \qquad (I)$$

wherein p=0, 1 or 2, $R^1$, $R^2$, and $R^3$ may be the same or different and represent alkylene groups having 1–4 carbon atoms, X and Y may be the same or different and have the meaning of —H, —OH, —OR$^4$ or —C(O)OR$^5$, wherein R$^4$ has the meaning of an alkyl group or acyl group with 1–3 carbon atoms, and R$^5$ has the meaning of —H, an ammonium group or an alkyl group with 1–3 carbon atoms.

Also disclosed is a process for activating the thus presulfided catalyst.

5 Claims, No Drawings

PROCESS FOR THE PREPARATION OF A PRESULFIDED AND SULFIDED CATALYST

BACKGROUND OF THE INVENTION

The invention relates to a process for the ex situ preparation of a presulfided catalyst, a process for the preparation of a sulfided catalyst by activation of the presulfided catalyst, and the use of said sulfided catalyst in the catalytic hydrotreatment of hydrocarbon-containing feeds.

In the oil industry many processes are known in which hydrocarbon-containing feeds are catalytically treated with hydrogen, such as hydrodesulfurizing, hydrodenitrogenizing, and hydrocracking. In such processes use is made of catalysts built up from a carrier material, such as alumina, on which there are deposited one or more catalytically active metals or compounds thereof; examples of such metals are molybdenum, nickel, cobalt, and tungsten. It is common knowledge that optimum results are obtained in using such catalysts when the catalytically active metals are in their sulfided form.

In actual practice sulfidation is generally carried out in situ, i.e. in the reactor in which the final hydrotreatment of the hydrocarbon-containing feed is carried out. Having been introduced into the reactor, the fresh or regenerated catalyst during the start-up procedure is contacted at elevated temperature with a hydrogen gas stream mixed with a sulfiding agent, such as hydrogen sulfide, dimethyl disulfide, or carbon disulfide, or with a hydrogen gas stream combined with a hydrocarbon-containing feed containing either an added sulfiding agent (a so-called spiked feed) or natural sulfur compounds. In this connection see for instance H. Hallie's article in Oil & Gas Journal, Dec. 20, 1982, Technology, pp. 69-74.

A recent development in this field is so-called ex situ presulfidation. In this process the fresh or regenerated catalyst is treated (impregnated) with a sulfur compound, which may be in the dissolved state or not, outside the reactor in which the final hydrotreatment of hydrocarbon-containing feed is carried out. Following optional drying to remove the solvent, the thus presulfided catalyst is activated, i.e. brought into the sulfided state, by being contacted at elevated temperature with hydrogen gas in the presence or not of a sulfiding agent or a sulfur-containing feed (spiked or non-spiked).

Proposals in the ex situ presulfidation field concentrate on the use of specific sulfur compounds. Thus Japanese Patent Application No. 63-302952 (published on Dec. 9, 1988) describes organic sulfur compounds containing at least one mercapto group and having a boiling point exceeding 100° C.; in the examples use is made, int. al., of diethylene thioether dithiol. European Patent Application No. 0,289,211 also describes mercapto group-containing organic compounds, viz. mercapto-carboxylic acids, bivalent mercaptans, amino-substituted mercaptans, and thiocarboxylic acids. Compounds employed in the examples include 1,2-ethanedithiol and 1,4 butanedithiol. Finally, European Patent Application No. 0,352,851 recommends the use of organic sulfur compounds that preferably contain at least two sulfur atoms, while in the examples use is made of, int. al., 2,2'-dithiodiethanol.

However, there are drawbacks to the use of the sulfur compounds proposed so far. For instance, the mercapto groups (—SH) containing compounds have an objectionable odor, which renders their use on an industrial scale problematic. Also, it has been found that catalysts presulfided using the hitherto proposed sulfur compounds display undesired self-heating characteristics. The term self-heating is used to describe the phenomenon of a material acquiring a temperature in excess of the ambient temperature as a result of the spontaneous occurrence in it of exothermic processes. In the case of catalysts presulfided using organic sulfur compounds (and in that of many other materials) non-dissipation or insufficient dissipation of this heat will generate an uncontrolled rise in temperature that can objectionably affect the chemical composition of the material in an unpredictable way and, in the worst case, lead to spontaneous combustion.

SUMMARY OF THE INVENTION

The present invention envisages meeting the aforementioned drawbacks. To this end according to the invention use is made in the ex situ presulfidation of organic sulfur compounds with a boiling point exceeding 100° C. and satisfying the formula $$X-R^1-S-R^2-_pS-R^3-Y \qquad (I)$$

wherein p=0, 1 or 2,
$R^1$, $R^2$, and $R^3$ may be the same or different and represent alkylene groups having 1-4 carbon atoms,
X and Y may be the same or different and have the meaning of —H, —OH, —OR$^4$ or —C(O)OR$^5$, wherein
R$^4$ has the meaning of an alkyl group or an acyl group with 1-3 carbon atoms, and
R$^5$ has the meaning of —H, an ammonium group or an alkyl group with 1-3 carbon atoms.

This process makes it possible to have ex situ presulfidation employing compounds that do not cause odor nuisance, and presulfided catalysts are obtained which have a self-heating tendency within acceptable limits.

DETAILED DESCRIPTION OF THE INVENTION

The fresh or regenerated catalysts to be presulfided according to the process of the invention are those which are known in the prior art for use in the sulfided form in the catalytic hydrotreatment of hydrocarbon-containing feeds, for instance in hydrodesulfurizing, hydrodenitrogenizing, hydrodemetallizing, hydroreforming (which process in the present context is also considered to be a hydrotreatment of hydrocarbon-containing feeds), hydroisomerizing, hydrocracking, hydroalkylating, and hydrodealkylating. Such catalysts generally contain a carrier material, such as alumina, silica, silica-alumina, or crystalline aluminosilicate, with deposited thereon one or more metals or compounds of metals such as oxides, the metals being selected from the groups Ib, Vb, VIb, VIIb, and VIII of the Periodic System. Typical examples of these metals are iron, cobalt, nickel, tungsten, molybdenum, chromium, vanadium, copper, palladium, and platinum as well as combinations thereof. Preference is given to molybdenum, tungsten, nickel, cobalt, and combinations thereof. The metal content of the catalysts generally is 0.1-50 wt. %, calculated on the weight of the total catalyst. In addition, the catalysts may contain other components, such as phosphorus, halogens, borium, zeolites, and clays including pillared clays.

The shape of the catalysts is dependent on the process in which they are employed. Most frequently used are extruded particles (cylindrical, polylobes) and fluidizable particles.

The sulfur compounds to be used in the presulfiding process should have a boiling point exceeding 100° C. and satisfy the aforementioned formula (I). As typical examples of such compounds may be mentioned 2,2'-thiodiethanol,
thiodiglycolic acid,
3,3'-thiodipropanol,
3,3'-thiodipropanoic acid,
the n-butyl ether of 2-(methylthio)ethanol,
[2-(methylthio)ethyl]acetate,
1,6-dihydroxy-2,5-dithiahexane,
3,6-dithiaheptanoic acid, and
1,9-dihydroxy-2,5,8-trithianonane.

Preferred compounds are those wherein (cf. formula (I))

p=0 or 1, more particularly p=0,
$R^1$, $R^2$, and $R^3$ are linear and, more particularly, have 1 or 2 carbon atoms, and/or
X and Y have the meaning of —H or —OH, more particularly of —OH.

Also, combinations of sulfur compounds may be employed The amount of sulfur compound to be used in general is selected in such a way that there is deposited on the catalyst an amount of sulfur which, calculated on the sulfides that will finally be formed (e.g. $MoS_2$, $CoqS_8$), is in the range of 0.5 x to 1.5 x the stoichiometrically required amount.

Usually, it is desired that the sulfur compound should be dissolved in, or mixed with, a solvent. Of course, the nature of the solvent is dependent on the type of sulfur compound employed. Both water and organic solvents may be used.

The sulfur compound can be deposited on the catalyst by means of conventional impregnating techniques, such as immersion, impregnation by spraying and pore volume saturation. If a solvent has been employed, there will have to be a drying step after the sulfur compound has been deposited on the fresh or regenerated catalyst, in order to remove the solvent or solvent remainders. To this end use may be made of conventional equipment, such as ovens, vacuum driers, and belt driers.

Next, the resulting presulfided catalyst should be activated in order to bring the catalyst into the sulfided form. Such activation is carried out by passing hydrogen gas, in combination or not with either a sulfiding agent or a sulfur-containing feed, (spiked or non-spiked) over the presulfided catalyst at a temperature in the range of 100° C. to 600° C., preferably in the range of 100° C. to 400° C., and a hydrogen pressure in the range of 1 to 300 bar, preferably of 1 to 100 bar. This process step may be carried out either ex situ, i.e. in a separate reactor, or in situ, i.e. in the reactor in which the catalyst will be used.

The catalyst thus prepared is suitable to be used in the catalytic hydrotreatment of hydrocarbon-containing feeds. The most significant of these processes are hydrodesulfurizing, hydrodenitrogenizing, hydrodemetallizing, hydroreforming, hydroisomerizing, hydrocracking, and mild hydrocracking. The process equipment to be used and the conditions under which the reactions are carried out vary with the process used and have been described in detail in the prior art. See for instance M. De Wind et al., Proceedings of symposium on catalyst performance testing, Mar. 28/29, 1988, pp. 29–42; published by Unilever Research Laboratories, Vlaardingen, The Netherlands. Very generally, the following reaction conditions apply here: temperatures in the range of 200° C. to 550° C., LHSV values in the range of 0.1 to 10 hours$^{-1}$, partial hydrogen pressures in the range of 10 to 300 bar, and hydrogen/hydrocarbon ratios in the range of 50 to 5000 $Nm^3/m^3$.

The invention will be further described in the following examples.

EXAMPLE 1

In a rotating impregnator 1700 g of fresh catalyst KF-165 ® (a commercial HDS catalyst ex Akzo Chemicals; chemical composition: 15.5% by weight of $MoO_3$, 4.5% by weight of CoO, alumina carrier; PV ($H_2O$): 0.5 ml/g) were treated at room temperature with a mixture (overall volume 850 ml) of water and 603 g of 2,2'-thiodiethanol, use being made of the pore volume saturation technique. After the product had been dried in air for 2 hours at 80° C., the sulfur content of the presulfided catalyst was 7.3% by weight.

EXAMPLE 2

In analogous manner to that described in Example 1 1500 g of catalyst KF-165 ® were impregnated with an aqueous solution of 528.4 g of 1,6-dihydroxy-2,5-dithiahexane (overall volume 750 ml). After the whole had been dried under reduced pressure for 2 hours at 80° C., the sulfur content of the presulfided catalyst was 6.6% by weight

COMPARATIVE EXAMPLE 3

In analogous manner to that described in Example 1 1500 g of catalyst KF-165 ® were impregnated with a mixture (overall volume 750 ml) of ethanol and 186.7 g of 1,2-ethanedithiol. After the whole had been dried under reduced pressure for 2 hours at 120° C., the sulfur content of the presulfided catalyst was 7.1% by weight.

COMPARATIVE EXAMPLE 4

In analogous manner to that described in Example 1 1200 g of catalyst KF-165 ® were impregnated with a mixture (overall volume 600 ml) of ethanol and 193.9 g of 1,4-butanedithiol. After the whole had been dried under reduced pressure for 2 hours at 85° C., the sulfur content of the presulfided catalyst was 7.1% by weight.

COMPARATIVE EXAMPLE 5

In analogous manner to that described in Example 1 1200 g of catalyst KF-165 ® were impregnated with 237.7 g of diethylene thioether dithiol. The sulfur content of the presulfided catalyst was 7.7% by weight.

COMPARATIVE EXAMPLE 6

In analogous manner to that described in Example 1 900 g of catalyst KF-165 ® were impregnated with an aqueous solution of 261 g of 2,2'-dithiodiethanol (overall volume 450 ml). After the whole had been dried in air for 2 hours at 80° C., the sulfur content of the presulfided catalyst was 7.9% by weight.

COMPARATIVE EXAMPLE 7

In analogous manner to that described in Example 1 1700 g of catalyst KF-165 ® were impregnated with a solution (overall volume 850 ml) of 306 g of 2,2'-trithiodiethanol in a mixture of water and ethanol (3:1 v/v). After the whole had been dried in air for 2 hours at 80°

C., the sulfur content of the presulfided catalyst was 8.3% by weight.

Self-heating Test

The presulfided catalysts described above were examined with regard to self-heating characteristics along the lines of the description in the Recommendations on the transport of dangerous goods, 5th revised edition, United Nations Publications, Chapter 14, pp. 365-377, more particularly p. 375.

In the described test a cubic basket of stainless steel gauze having a mesh opening of 0.053 mm is filled with the material to be investigated and hung at the center of an oven. By means of suitably placed thermocouples the temperature of the material and the temperature of the oven are recorded as a function of time. Use was made of a 10 cm × 10 cm × 10 cm basket filled with 1000 ml of catalyst material. The starting temperature of the oven was 140° C. The basket was hung in the oven and the time and temperature were recorded. The following parameters were set for determining the self-heating characteristics:

$t_1$: the time at which the temperature of the catalyst material exceeded the oven temperature;

$t_2$: the time at which the temperature of the catalyst material exceeded the 200° C. limit The test results are given in the Table below. They show that catalysts presulfided according to the process of the invention (Examples 1 and 2) display more favorable self-heating characteristics than the catalysts of the comparative examples. This finding is remarkable, given the relatively small differences between the molecular structures of the used sulfur compounds. This is demonstrated most acutely by comparing the results of Example 1 with those of Comparative Examples 5 and 6. It might be concluded that a presulfiding process in which use is made of organic sulfur compounds containing one or more —SH groups and/or —S—S— groups will have a negative effect on the self-heating characteristics of the presulfided catalyst.

The results in the Table further show that presulfiding according to the invention is preferably carried out using a sulfur compound which contains not more than one thioether group [—C—S—C—]: cf. Examples 1 and 2.

The functional importance of the parameters $t_1$ and $t_2$ applied in the Table is that the greater the values found are, the less strict the precautions may be that are required for storing and transporting the catalyst in question, and for introducing it into the reactor.

TABLE

| Example | Sulfur compound | $t_1$ (min) | $t_2$ (min) |
|---|---|---|---|
| 1 | HO—C$_2$H$_4$—S—C$_2$H$_4$—OH | 300 | 970 |
| 2 | HO—CH$_2$—S—C$_2$H$_4$—S—CH$_2$—OH | 360 | 430 |
| 3 (1) (2) | HS—C$_2$H$_4$—SH | 85 | 110 |
| 4 (1) (2) | HS—C$_4$H$_8$—SH | 65 | 105 |
| 5 (1) (3) | HS—C$_2$H$_4$—S—C$_2$H$_4$—SH | 120 | 240 |
| 6 (1) (4) | HO—C$_2$H$_4$—S—S—C$_2$H$_4$—OH | 240 | 300 |
| 7 (1) | HO—C$_2$H$_4$—S—S—S—C$_2$H$_4$—OH | 150 | 215 |

(1) Comparative examples
(2) According to EP-A 0,289,211
(3) According to JA 63-302952
(4) According to EP-A 0,352,851

We claim:

1. A process for the preparation of a presulfided catalyst which following activation is suitable for use in the catalytic hydrotreatment of hydrocarbon-containing feeds comprising providing ex situ a fresh or regenerated catalyst containing a carrier material and one or more catalytically active metals or metal compounds with an effective amount of an organic sulfur compound with a boiling point exceeding 100° C. and having formula $$X-R^1-S-R^2-_pS-R^3-Y \qquad (I)$$

wherein p=0, 1 or 2, $R^1$, $R^2$, and $R^3$ may be the same or different and represent alkylene groups having 1-4 carbon atoms, X and Y may be the same or different and have the meaning of —OH, —OR$^4$ or —C(O)OR$^5$, wherein $R^4$ has the meaning of an alkyl group or acyl group with 1-3 carbon atoms, and $R^5$ has the meaning of —H, an ammonium group or an alkyl group with 1-3 carbon atoms.

2. The process of claim 1, wherein X and Y same are —OH.

3. The process of claim 1 wherein p=0.

4. The process of claim 1 wherein one or more catalytically active metals are selected from the groups VIb or VIII of the Periodic System.

5. A process for the preparation of a sulfided catalyst suitable for use in the catalytic hydrotreatment of hydrocarbon-containing feeds comprising contacting a presulfided catalyst prepared in accordance with the process of claim 1 at elevated temperature with hydrogen gas or hydrogen gas in combination with a sulfiding agent or a sulfur-containing feed.

* * * * *

UNITED STATES PATENT AND TRADEMARK OFFICE
CERTIFICATE OF CORRECTION

PATENT NO. : 5,017,535
DATED : May 21, 1991
INVENTOR(S) : J. SCHOONHOVEN et al

It is certified that error appears in the above-identified patent and that said Letters Patent is hereby corrected as shown below:

In the Abstract the formula should read:

$$X-R^1(S-R^2)_p S-R^3-Y \qquad (I)$$

In column 2, line 24, the formula should read:

$$X-R^1(S-R^2)_p S-R^3-Y \qquad (I)$$

In column 6, line 25, the formula should read:

$$X-R^1(S-R^2)_p S-R^3-Y \qquad (I)$$

In column 6, lines 37 and 38 the claim should read:

The process of claim 1, wherein X and Y are -OH.

Signed and Sealed this

First Day of December, 1992

*Attest:*

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 5,017,535
DATED : May 21, 1991
INVENTOR(S) : J. SCHOONHOVEN et al.

It is certified that error appears in the above—identified patent and that said Letters Patent is hereby corrected as shown below:

In the Abstract the formula should read:

$$X-R^1\{S-R^2\}_p S-R^3-Y \qquad (I)$$

In the Abstract the meaning of "X" and "Y" should read:
    $-OH$, $-OR^4$ or $-C(O)OR^5$, Signed and Sealed this Twenty-third Day of November, 1993

Attest:

BRUCE LEHMAN

Attesting Officer      Commissioner of Patents and Trademarks